(12) United States Patent
Forrest

(10) Patent No.: US 8,060,988 B2
(45) Date of Patent: Nov. 22, 2011

(54) INSERT FOR KNOBS FORMED OF BRITTLE MATERIAL

(75) Inventor: Earl David Forrest, Asheboro, NC (US)

(73) Assignee: Liberty Hardware Mfg. Corp., Winston-Salem, NC (US)

(*) Notice: Subject to any disclaimer, the term of this patent is extended or adjusted under 35 U.S.C. 154(b) by 36 days.

(21) Appl. No.: 12/203,194

(22) Filed: Sep. 3, 2008

(65) Prior Publication Data

US 2010/0050391 A1    Mar. 4, 2010

(51) Int. Cl.
*G05G 1/06* (2006.01)

(52) U.S. Cl. ........................................ 16/441

(58) Field of Classification Search ............ 16/441, 16/DIG. 30, 417, 433; 292/348–355, DIG. 53, 292/DIG. 54; 411/82–82.3
See application file for complete search history.

(56) References Cited

U.S. PATENT DOCUMENTS

| | | | |
|---|---|---|---|
| 1,593,939 A | 7/1926 | Holstein | |
| 1,746,059 A | 2/1930 | Swanson | |
| 2,061,811 A | 11/1936 | Sinko | |
| 2,190,192 A | 2/1940 | Raymond | |
| 2,438,237 A * | 3/1948 | Toelke | 174/158 F |
| 2,982,989 A | 5/1961 | Heyer | |
| 3,338,604 A * | 8/1967 | Van Buren, Jr. | 403/280 |
| 3,541,882 A * | 11/1970 | Testa | 74/553 |
| 4,972,545 A | 11/1990 | Ozagir | |
| 5,537,893 A * | 7/1996 | Snider | 74/553 |
| 5,722,119 A | 3/1998 | Wang | |
| 6,231,092 B1 * | 5/2001 | Shields et al. | 292/347 |
| 6,463,630 B1 * | 10/2002 | Howie, Jr. | 16/441 |
| 7,246,413 B2 * | 7/2007 | Portelli | 16/414 |
| 2003/0163903 A1 * | 9/2003 | Rodawold, Jr. | 16/441 |
| 2005/0210632 A1 * | 9/2005 | Forrest et al. | 16/441 |
| 2008/0263830 A1 * | 10/2008 | Yoshinaka et al. | 16/433 |

FOREIGN PATENT DOCUMENTS

JP    2001304229    10/2001

* cited by examiner

*Primary Examiner* — Robert Sandy
*Assistant Examiner* — Matthew Sullivan
(74) *Attorney, Agent, or Firm* — Carlson, Gaskey & Olds, PC

(57) ABSTRACT

A knob is formed of a relatively brittle material, and has a bore to receive an insert. The insert is received in the bore, and includes an internal bore to receive a fastener member to secure the knob to an underlying structure. The insert is formed with an axial passage on an outer surface of the insert. The axial passage is between the insert and an inner surface of the bore in the knob. The insert extends into the bore along an axial direction. The axial passages extend with at least a component in an axial direction. The adhesive is received in the bore in the knob, and moves upwardly into the axial passage in the insert.

7 Claims, 2 Drawing Sheets

INSERT FOR KNOBS FORMED OF BRITTLE MATERIAL

BACKGROUND OF THE INVENTION

This application relates to a threaded insert to be received within a ceramic knob to facilitate attachment of the knob to an underlying structure.

Furniture closures, such as drawers or doors, are typically provided with a decorative knob that is utilized to move the drawer or door. The knobs can be formed from many materials, and are often connected to underlying structure such as via threaded fastener.

Some knobs have been manufactured from a brittle material such as a ceramic. Ceramic cannot be formed to have screw threads, nor can it receive a threaded member such as a screw or bolt. Thus, it is known for ceramic knobs to include a threaded insert which is received within a bore in a rear face of the knob.

To date, the threaded inserts have been forced into the bore and held in the bore with adhesive. Typically, the threaded insert has a plurality of circumferentially extending channels which receive adhesive. In additions, barbs or knurls may be included to secure the threaded insert within the knob.

These inserts are not always adequately retained within the knob.

SUMMARY OF THE INVENTION

In the disclosed embodiment of this invention, a threaded insert is held within a knob formed of a relatively brittle material and is provided with adhesive grooves which extend parallel to an axis through which the threaded attachment member will extend. In the disclosed embodiment, the adhesive grooves extend for the majority of an axial distance of the threaded fastener, and have circumferentially extending branch lines.

These and other features of the present invention can be best understood from the following specification and drawings, the following of which is a brief description.

DETAILED DESCRIPTION OF THE PREFERRED EMBODIMENT

Figure 1:
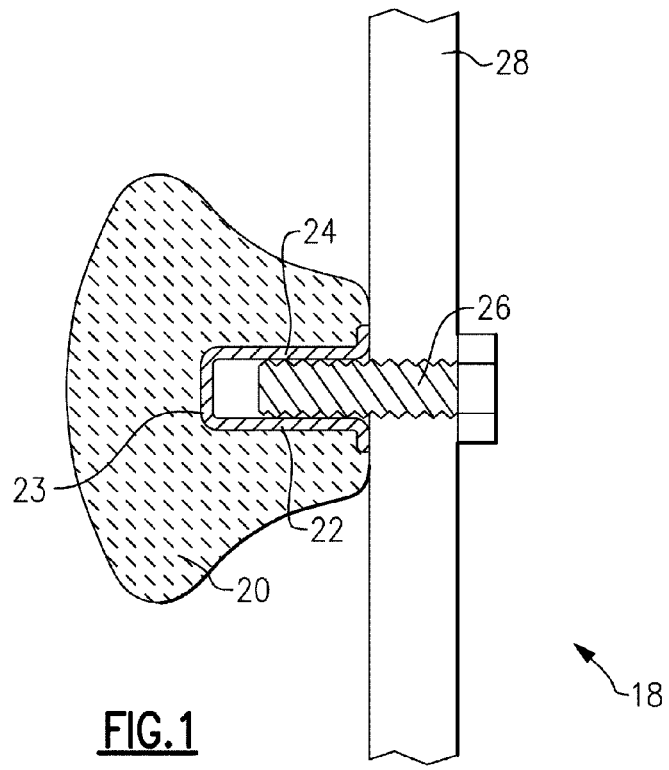
FIG. 1 is a cross-sectional view showing an assembled knob.

A furniture assembly 18 is illustrated in FIG. 1 having a knob 20 with a bore 22. Ends 23 of the bore are rounded off, to eliminate sharp edges as have been formed in prior art knobs.

An internally threaded insert 24 is inserted within the bore 22. A threaded fastener member 26 extends through a furniture support, such as a drawer or door 28, and is received within threads in the interior of the threaded member 24.

Figure 2:
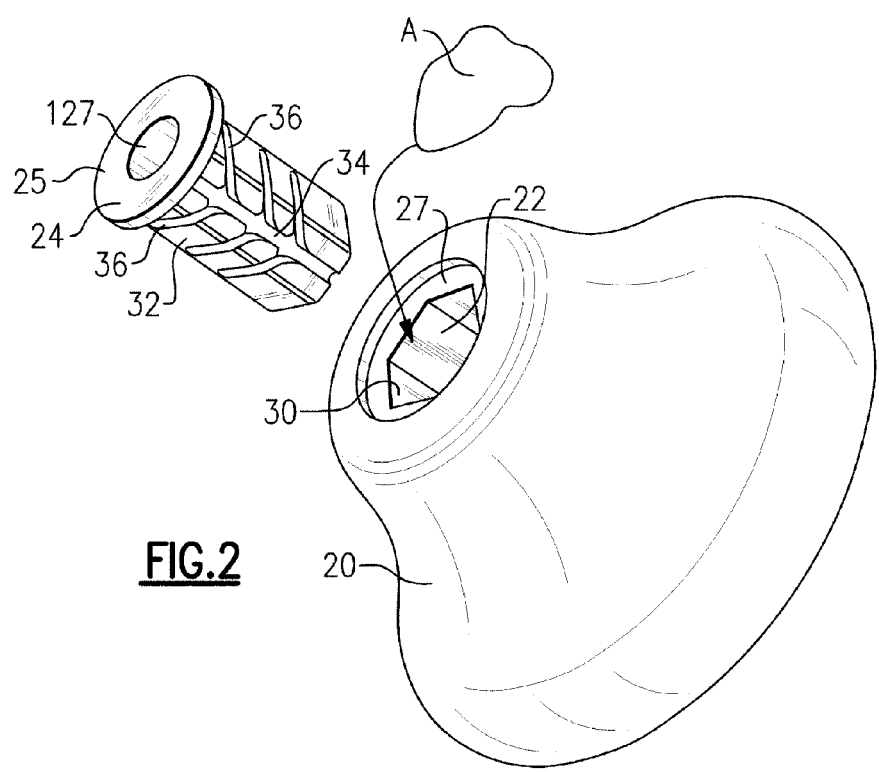
FIG. 2 shows an exploded view of the knob and its insert.

FIG. 2 is an exploded view of the knob 20 and insert 24. As can be appreciated, a head 25 on the insert sits within a recess 27 on the knob. The head 25 provides a stop surface to position the threaded insert 24 in a desired location within the knob 20. In addition, a bore 127 within the threaded insert includes screw threads to receive the threaded member 26.

There are planar surfaces 30 within the bore 22 which mate with planar surfaces 32 on the threaded insert 24. In addition, an adhesive passage 34 extends for the majority of an axial length of the body of the threaded insert. Branch lines 36 extending circumferentially from passage 36. When the threaded insert 24 is initially inserted into the bore 22, an adhesive is also inserted into the bore 22. Adhesive A is shown schematically being inserted into the bore 22 ahead of the insert 24. The adhesive passages or channels 34 and 36 receive the adhesive which is forced upwardly by a hydraulic force caused as the insert 24 is depressed into the knob 22.

Figure 3A:
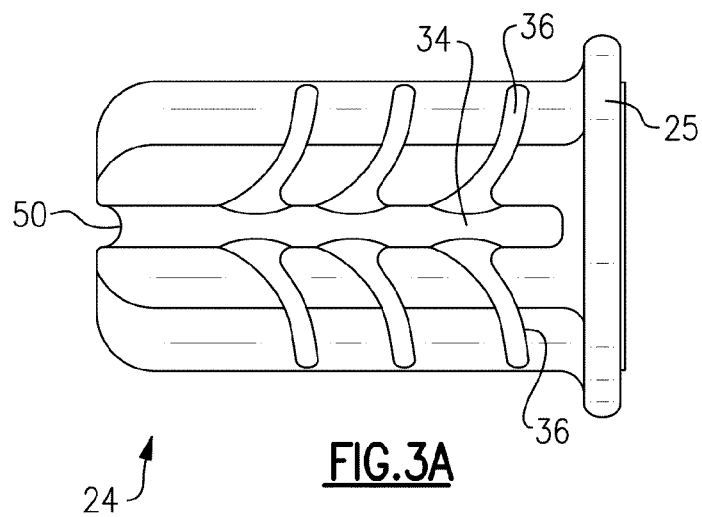
FIG. 3A is the first view of the insert.
Figure 3B:
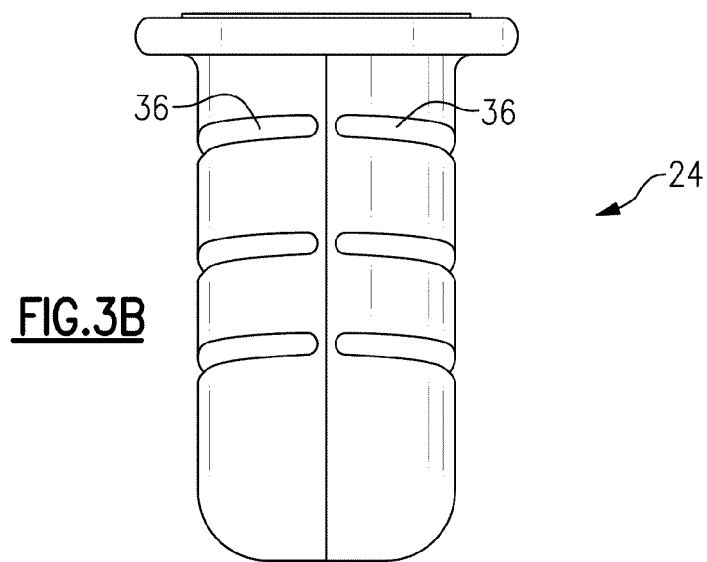
FIG. 3B is a second view of the insert.
Figure 3C:
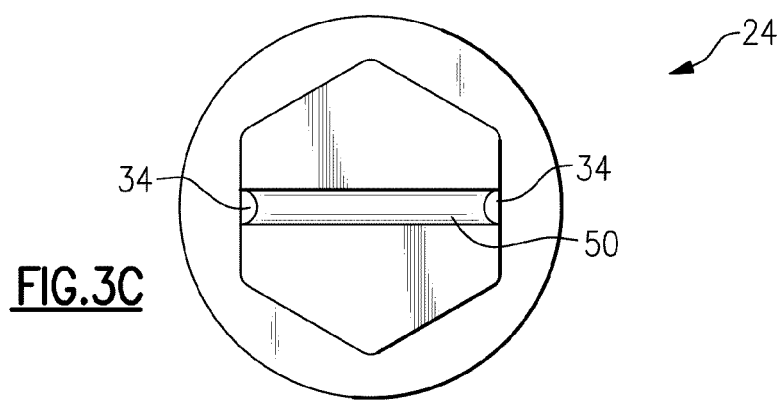
FIG. 3C is a bottom view of the insert.

As can be appreciated, in particular from FIG. 3C for example, there are two passages 34 formed at circumferentially spaced positions on the insert. In addition, it is also clear that the passages do not extend through the entire outer wall of the insert, but rather are simply passages formed into the outer wall.

As shown in FIG. 3A, the threaded insert 24 has a bottom groove 50 which connects the axial passage 34 to an opposed axial passage spaced from the illustrated axial passage 34 by 180°. As illustrated, the branch passages 36 extend in both directions circumferentially. As can be appreciated, the passage 34 does not extend the entire axial length, but does extend through a majority of the length.

FIG. 3B shows that the passages 36 do not actually touch, but do come close to each other from the two opposed main passages 34.

FIG. 3C is a bottom view of the insert 24 and shows that the bottom passage 50 does extend across the entire width of the insert 24 and does connect the axial passages 34 on opposed sides of the threaded fastener.

Now, with this invention, adhesive which is received within the bore 22 will extend upwardly through the passages 34 and into the circumferential passages 36. Thus, the threaded fastener will be firmly secured within the bore 22.

While the axial passages 34 are shown extending directly axially, it should be understood that the goals of this invention can be achieved with an axial passage which extends along a direction having at least a component in the axial direction. That is, the direction of the axial passage can be somewhat offset from a direct axially direction.

While an embodiment of this invention has been disclosed, a worker of ordinary skill in this art would recognize that certain modifications would come within the scope of this invention. For that reason, the following claims should be studied to determine the true scope and content of this invention.

What is claimed is:

1. A knob comprising:
    a knob having a bore to receive an insert;
    an insert received in said bore, said insert including an internal bore to receive a fastener member to secure said knob to an underlying structure, and said insert being formed with an axial passage on an outer surface of said insert, said axial passage being between said insert and an inner surface of said bore in said knob, and said insert extending into said bore along an axial direction, said axial passages extending with at least a component in said axial direction, and adhesive received in said bore in said knob, and moving upwardly into said axial passage in said insert;
    said knob being formed of a ceramic material;
    said insert having an enlarged head at an outer axial position, and said enlarged head providing a stop against a recess in said knob to define a stop surface for insertion of said insert;

said bore in said insert including screw threads to receive a threaded fastener; said axial passages not extending throughout an entire wall of said insert, but being formed into an outer periphery of the wall;

said axial passage including a pair of axial passages positioned at circumferentially spaced locations of said insert; and said insert having a closed axially inner end, and there being a bottom passage that extends across the inner end of the insert to connect the axial passages.

2. The knob as set forth in claim 1, wherein said axial passage communicates adhesive to branch passages extending circumferentially from said axial passage.

3. The knob as set forth in claim 1, wherein said insert axially extends the entire length of said bore.

4. The knob as set forth in claim 1, wherein said inner end of said insert abuts an inner end of said bore.

5. A knob comprising:

a knob formed of a ceramic material, and having a bore to receive an insert;

an insert received in said bore, said insert including an internal threaded bore to receive a threaded fastener to secure said knob to an underlying structure, and said insert being formed with a pair of axial passages on an outer surface of said insert, said axial passages being between said insert and an inner surface of said bore in said knob, and said insert extending into said bore along an axial direction, said axial passages extending with at least a component in said axial direction, and adhesive received in said bore in said knob, and moving upwardly into said axial passages in said insert;

said insert having an enlarged head at an outer axial position, and said enlarged head providing a stop against a recess in said knob to define a stop surface for insertion of said insert;

said axial passages connected at an inner end of said insert;

said axial passages communicating adhesive to branch passages extending circumferentially from said axial passage, and said axial passages not extending throughout an entire wall of said insert, but being formed into an outer periphery of the wall.

6. The knob as set forth in claim 5, wherein said insert axially extends the entire length of said bore.

7. The knob as set forth in claim 5, wherein said inner end of said insert abuts an inner end of said bore.

\* \* \* \* \*